US006606714B1

(12) United States Patent
Thelin

(10) Patent No.: US 6,606,714 B1
(45) Date of Patent: Aug. 12, 2003

(54) DISK DRIVE USING DEFECT LIST TO PERFORM UNINTERRUPTED WRITING OF NON-RELOCATED DATA BLOCKS AND CACHING OF RELOCATED DATA BLOCKS FOR DEFERRED WRITING

(75) Inventor: Gregory B. Thelin, Garden Grove, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/550,465

(22) Filed: Apr. 17, 2000

(51) Int. Cl.$^7$ ................................................. G11B 5/09
(52) U.S. Cl. ............................................... 714/8; 714/6
(58) Field of Search ........................................ 714/6, 8

(56) References Cited

U.S. PATENT DOCUMENTS

| | | | | | |
|---|---|---|---|---|---|
| 5,740,358 | A | * | 4/1998 | Geldman et al. | ............. 360/48 |
| 6,034,831 | A | * | 3/2000 | Dobbek et al. | ................ 711/4 |
| 6,189,110 | B1 | * | 2/2001 | Saitoh et al. | ................... 714/8 |
| 6,295,176 | B1 | * | 9/2001 | Reddy et al. | ................ 360/48 |
| 6,330,641 | B1 | * | 12/2001 | Yoshioka | ...................... 711/113 |
| 6,373,800 | B1 | * | 4/2002 | Takahashi | ................ 369/53.15 |
| 6,385,744 | B1 | * | 5/2002 | Ando et al. | .................... 360/53 |
| 6,389,503 | B1 | * | 5/2002 | Georgis et al. | ................ 711/4 |

FOREIGN PATENT DOCUMENTS

JP   1993066999 A  *  3/1993  ........... G06F/12/08

* cited by examiner

Primary Examiner—Scott Baderman
Assistant Examiner—Anne L. Damiano
(74) Attorney, Agent, or Firm—Milad G. Shara, Esq.; Howard H. Sheerin, Esq.

(57) ABSTRACT

A disk drive is disclosed for receiving a write command from a host computer, the write command comprising a plurality of logical block addresses (LBAs) and a plurality of data blocks. The plurality of data blocks comprises at least one non-relocated data block (NRDB) and at least one relocated data block (RDB), and at least one of the LBAs corresponds to the NRDB and at least one of the LBAs corresponds to the RDB. The disk drive comprises a disk comprising a plurality of first disk locations each having a defect, a plurality of second disk locations for storing NRDBs, and a plurality of spare disk locations for storing RDBs. A defect list is used to map LBAs from the plurality of first disk locations to the plurality of spare disk locations. A cache is logically partitioned into a first set of memory locations managed using a first cache data structure, and a second set of memory locations managed using a second cache data structure. A disk control system uses the first cache data structure to store the NRDB in a first memory location selected from the first set of memory locations. The disk control system evaluates the defect list using the LBAs to identify the RDB and using the second cache data structure stores the RDB in a second memory location selected from the second set of memory locations. During a first time interval established for writing NRDBs, the disk control system uses the first cache data structure to write the NRDB to one of the second disk locations. During a second time interval established for writing RDBs, the disk control system uses the second cache data structure to write the RDB to one of the spare disk locations.

8 Claims, 5 Drawing Sheets

DISK DRIVE USING DEFECT LIST TO PERFORM UNINTERRUPTED WRITING OF NON-RELOCATED DATA BLOCKS AND CACHING OF RELOCATED DATA BLOCKS FOR DEFERRED WRITING

BACKGROUND OF THE INVENTION

1. Field of the Invention

The present invention relates to disk drives for computer systems. More particularly, the present invention relates to using a defect list to perform uninterrupted writing of non-relocated data blocks and caching of relocated data blocks for deferred writing.

2. Description of the Prior Art

Disk drives typically employ some form of defect management for mapping defective sectors in data tracks recorded on a disk to spare disk locations. As illustrated in FIG. 1A, a data track 4 may comprise a predetermined number of disk locations, where a predetermined number of the disk locations are spare disk locations. The example data track 4 of FIG. 1A comprises twelve disk locations, the last three of which are spare disk locations. The disk will also typically include a plurality of spare tracks comprising only spare disk locations as illustrated by the spare track 6 shown in FIG. 1A.

The disk locations in a track are identified by a physical block address (PBA), for example, a consecutive sequence of numbers. A host computer connected to the disk drive will provide a logical block address (LBA) to the disk drive in connection with a request to write or read data. The disk drive translates the LBA into the corresponding PBA which facilitates defect management in a manner that is transparent to the host computer.

One known method for defect management is to "push down" LBAs past defective disk locations that are discovered during manufacturing of the disk drive. When a defective disk location is discovered during normal operation (i.e., a "grown defect"), the LBA associated with the defective disk location is mapped to a spare disk location in one of the spare tracks. This defect management technique is illustrated in FIG. 1A which shows a data track 4 comprising a defective disk location discovered during manufacturing, and three defective disk locations discovered during normal operation. The defective disk location discovered during manufacturing has a PBA of 2 and therefore LBA 2 is assigned to PBA 3. The remaining LBA's are pushed down one disk location such that the last LBA (LBA 8) is assigned to the first spare disk location in the track having a PBA of 9. During normal operation, disk locations with PBAs of 4, 7 and 8 became defective and therefore the corresponding LBAs 3, 6 and 7 were mapped to spare disk locations of a spare track 6. The data blocks stored in the spare disk locations of the spare track 6 are referred to as "Relocated Data Blocks" (RDB), and the data blocks stored in the sectors of the data track 4 are referred to as "Non-Relocated Data Blocks" (NRDB).

The spare tracks are typically banded together on a reserved area of the disk, for example, at the inner diameter of the disk. This is illustrated in FIG. 1B which shows a disk drive 1 comprising a disk 2 including the data track 4 and the spare track 6 of FIG. 1A, wherein the spare track 6 is located at an inner diameter of the disk 2.

The disk drive 1 of FIG. 1B comprises a head 8 connected to an actuator arm 9 which is actuated radially over the disk 2, and disk control system 20 for executing the steps of a program to perform read and write operations. During a write operation, the disk drive 1 receives from a host a write command to write data blocks to the disk 2, typically in a consecutive sequence of LBAs. For example, the disk drive 1 may receive a request from the host to write LBAs 0–8 in FIG. 1A. The corresponding data blocks received from the host are stored sequentially in a cache 16 using a cache data structure 17. The disk control system 20 also employs a defect list 18 which stores information to facilitate translating the LBAs into the corresponding PBAs and then controls the head 8 to seek to the appropriate tracks. The data blocks are retrieved from the cache 16 using the cache data structure 17, and then written to the disk 2 via a write channel circuit 12 once the head is positioned over the target sector.

For example, when writing the LBA sequence 0–8 of FIG. 1A, the disk control system 20 positions the head 8 over data track 4, sequentially retrieves $NRDB_0$ and $NRDB_1$ from the cache 16 using the cache data structure 17, and then sequentially writes $NRDB_0$ and $NRDB_1$ to PBA 0 and PBA 1 via the write channel 12. Because LBA 2 has been pushed down to PBA 3 (as mapped by the defect list 18), the disk control systems 20 skips over PBA 2 and writes $NRDB_2$ to PBA 3. Because LBA 3 is mapped to PBA 0 of spare track 6, the disk control system 20 performs a seek operation to position the head 8 over spare track 6 in order to write $RDB_3$. The disk control system 20 then performs another seek operation to reposition the head 8 over data track 4 in order to write $NRDB_4$ and $NRDB_5$ to PBA 5 and PBA 6. Because LBA 6 and LBA 7 have been mapped to PBA 1 and PBA 2 of spare track 6, the disk control system 20 performs another seek operation to spare track 6 in order to write $RDB_6$ and $RDB_7$. Finally, the disk control system 20 performs yet another seek operation to reposition the head 8 over data track 4 in order to write $NRDB_8$ (to the first spare disk location of data track 4).

Seeking to a spare track during write operations in order to write relocated data blocks can increase significantly the access time of the disk drive 1. If the disk drive 1 cannot keep up with the data transfer rate of the host, the cache 16 will eventually fill up with data. The disk control system 20 will then signal the host to stop transferring data until more room is available in the cache 16. Thus, the write efficiency of the disk drive 1 is limited by the prior art technique of seeking to spare tracks during write operations to write relocated data blocks.

There is, therefore, a need to improve write efficiency in a disk drive, particularly with respect to writing relocated data blocks to spare tracks.

SUMMARY OF THE INVENTION

The present invention may be regarded as a disk drive for receiving a write command from a host computer, the write command comprising a plurality of logical block addresses (LBAs) and a plurality of data blocks. The plurality of data blocks comprises at least one non-relocated data block (NRDB) and at least one relocated data block (RDB), and at least one of the LBAs corresponds to the NRDB and at least one of the LBAs corresponds to the RDB. The disk drive comprises a disk comprising a plurality of first disk locations each having a defect, a plurality of second disk locations for storing NRDBs, and a plurality of spare disk locations for storing RDBs. A defect list is used to map LBAs from the plurality of first disk locations to the plurality of spare disk locations. A cache is logically partitioned into a first set of memory locations managed using a first cache data structure, and a second set of memory locations managed using a second cache data structure. A disk control system uses the first cache data structure to store the NRDB in a first memory location selected from the first set of memory locations. The disk control system evaluates the defect list using the LBAs to identify the RDB and using the second cache data structure stores the RDB in a second memory location selected from the second set of memory locations. During a first time interval established for writing NRDBs, the disk control system uses the first cache data structure to write the NRDB to one of the second disk locations. During a second time interval established for writing RDBs, the disk control system uses the second cache data structure to write the RDB to one of the spare disk locations.

The present invention may also be regarded as a method of performing a write operation in a disk drive in response to a write command received from a host computer, the write command comprising a plurality of logical block addresses and a plurality of data blocks. The plurality of data blocks comprises at least one non-relocated data block (NRDB) and at least one relocated data block (RDB), and at least one of the LBAs corresponds to the NRDB and at least one of the LBAs corresponds to the RDB. The disk drive comprises a disk comprising a plurality of first disk locations each having a defect, a plurality of second disk locations for storing NRDBs, and a plurality of spare disk locations for storing RDBs. A defect list is used to map LBAs from the plurality of first disk locations to the plurality of spare disk locations. A cache is logically partitioned into a first set of memory locations managed using a first cache data structure, and a second set of memory locations managed using a second cache data structure. The first cache data structure is used to store the NRDB in a first memory location selected from the first set of memory locations. The defect list is evaluated using the LBAs to identify the RDB and using the second cache data structure the RDB is stored in a second memory location selected from the second set of memory locations. During a first time interval established for writing NRDBs, using the first cache data structure the NRDB is written to one of the second disk locations. During a second time interval established for writing RDBs, using the second cache data structure the RDB is written to one of the spare disk locations.

DESCRIPTION OF THE PREFERRED EMBODIMENTS

Figure 2:
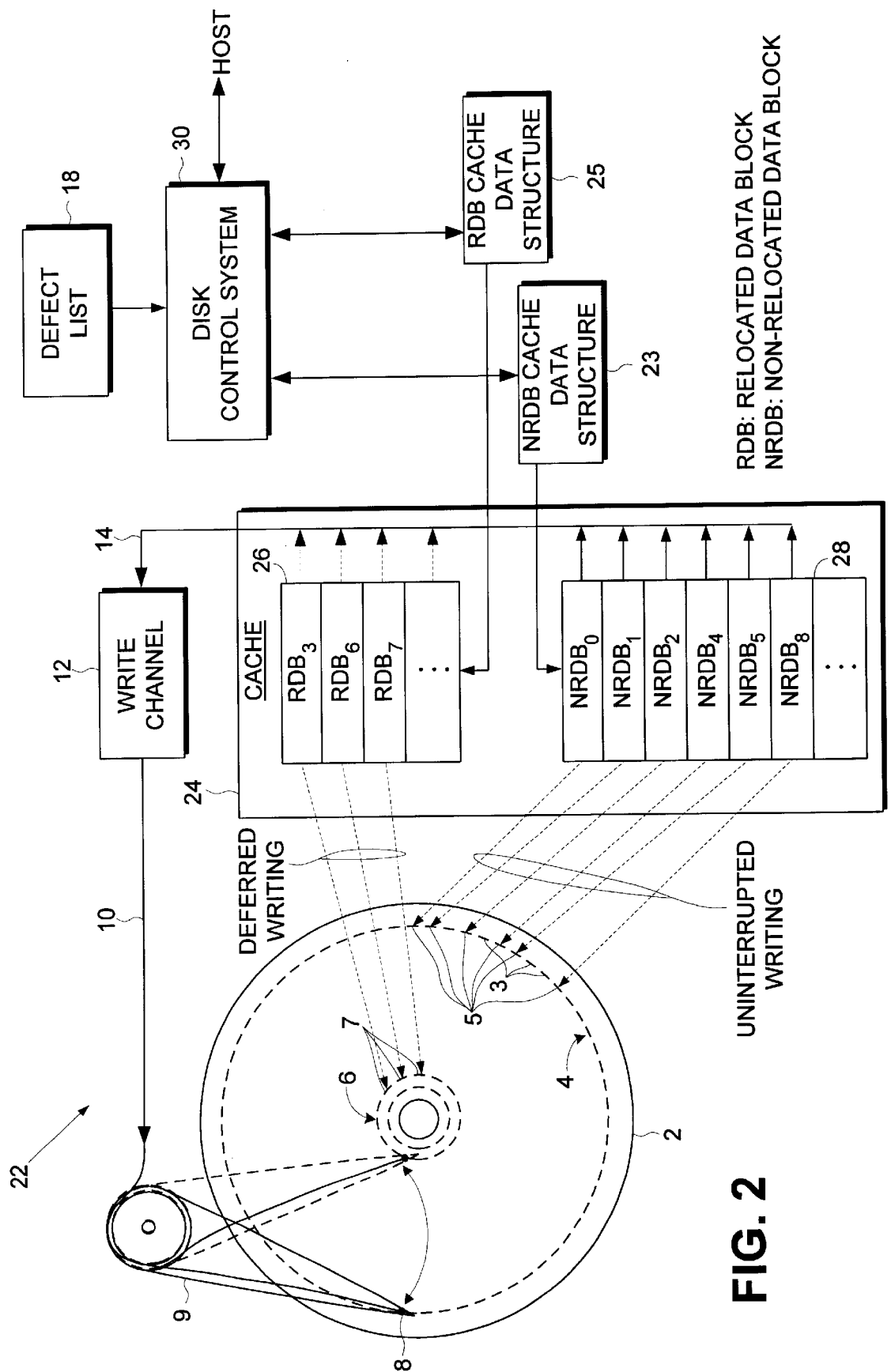
FIG. 2 shows a disk drive according to an embodiment of the present invention comprising a cache logically partitioned into a first set of memory locations managed using a NRDB cache data structure, and a second set of memory locations managed using a RDB cache data structure. The non-relocated data blocks received from the host are stored in the first set of memory locations using the NRDB cache data structure, and the relocated data blocks received from the host are stored in the second set of memory locations using the RDB data structure. The non-relocated data blocks are written to the disk uninterrupted during the write operation, and the relocated data blocks are written to the disk during a deferred time, such as during an idle time of the disk drive.

FIG. 2 shows a disk drive 22 according to an embodiment of the present invention for receiving a write command from a host computer, the write command comprising a plurality of logical block addresses (LBAs) and a plurality of data blocks. The plurality of data blocks comprises at least one non-relocated data block (NRDB) and at least one relocated data block (RDB), and at least one of the LBAs corresponds to the NRDB and at least one of the LBAs corresponds to the RDB. The disk drive 22 comprises a disk 2 comprising a plurality of first disk locations 3 each having a defect, a plurality of second disk locations 5 for storing NRDBs, and a plurality of spare disk locations 7 for storing RDBs. A defect list 18 is used to map LBAs from the plurality of first disk locations 3 to the plurality of spare disk locations 7. A cache 24 is logically partitioned into a first set of memory locations 28 managed using a first cache data structure 23 (NRDB cache data structure), and a second set of memory locations 26 managed using a second cache data structure 25 (RDB cache data structure). A disk control system 30 uses the first cache data structure 23 to store the NRDB in a first memory location selected from the first set of memory locations 28. The disk control system 30 evaluates the defect list 18 using the LBAs to identify the RDB and using the second cache data structure 25 stores the RDB in a second memory location selected from the second set of memory locations 26. During a first time interval established for writing NRDBs, the disk control system 30 uses the first cache data structure 23 to write the NRDB to one of the second disk locations 5. During a second time interval established for writing RDBs, the disk control system 30 uses the second cache data structure 25 to write the RDB to one of the spare disk locations 7.

The disk drive 22 of FIG. 2 comprises a head 8 for reading data from and writing data to the disk 2. The head is positioned radially over the disk by an actuator arm 9 rotated about a pivot by a voice coil motor (VCM not shown). During write operations, data is transferred from the cache 24 to a write channel 12 which modulates operation of the head 8 via write signal 10 in order to record the data to the disk 2.

In one embodiment, the disk control system 30 comprises a microprocessor for executing the steps of a program (not shown) for implementing the operations of the disk drive 22 (e.g., the cache management, read and write operations, etc.). The defect list 18 evaluated by the disk control system 30 stores information for mapping the LBAs received from the host into PBAs. Any suitable defect management technique may be employed to build the defect list 18 and generate PBAs from LBAs; examples are replete in the prior art and not disclosed here so as not to obscure the present invention.

The plurality of second disk locations 5 for storing the non-relocated data blocks are located in a data track 4, and the plurality of spare disk locations 7 for storing the relocated data blocks are located in a spare track 6 separated radially from the data track 4. In the embodiment of FIG. 2, all of the spare tracks (including spare track 6) are located at an inner diameter of the disk 2. However, spare tracks may be located anywhere on the disk 2. For example, spare tracks may be dispersed about the disk 2 in predefined concentric partitions.

Figure 1A:
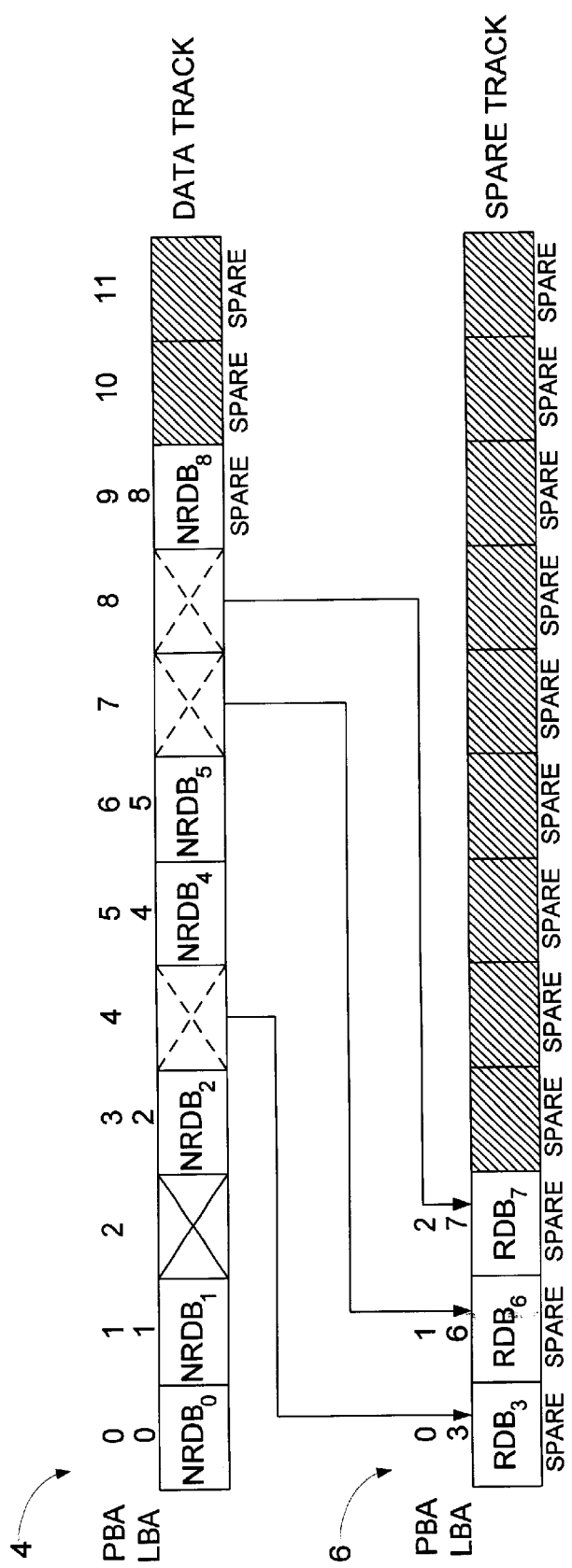
FIG. 1A illustrates a prior art defect management technique where defective sectors discovered during manufacturing are mapped using "push down", and defective sectors discovered during normal operation (i.e., grown defects) are mapped to spare disk locations of spare tracks.
Figure 1B:
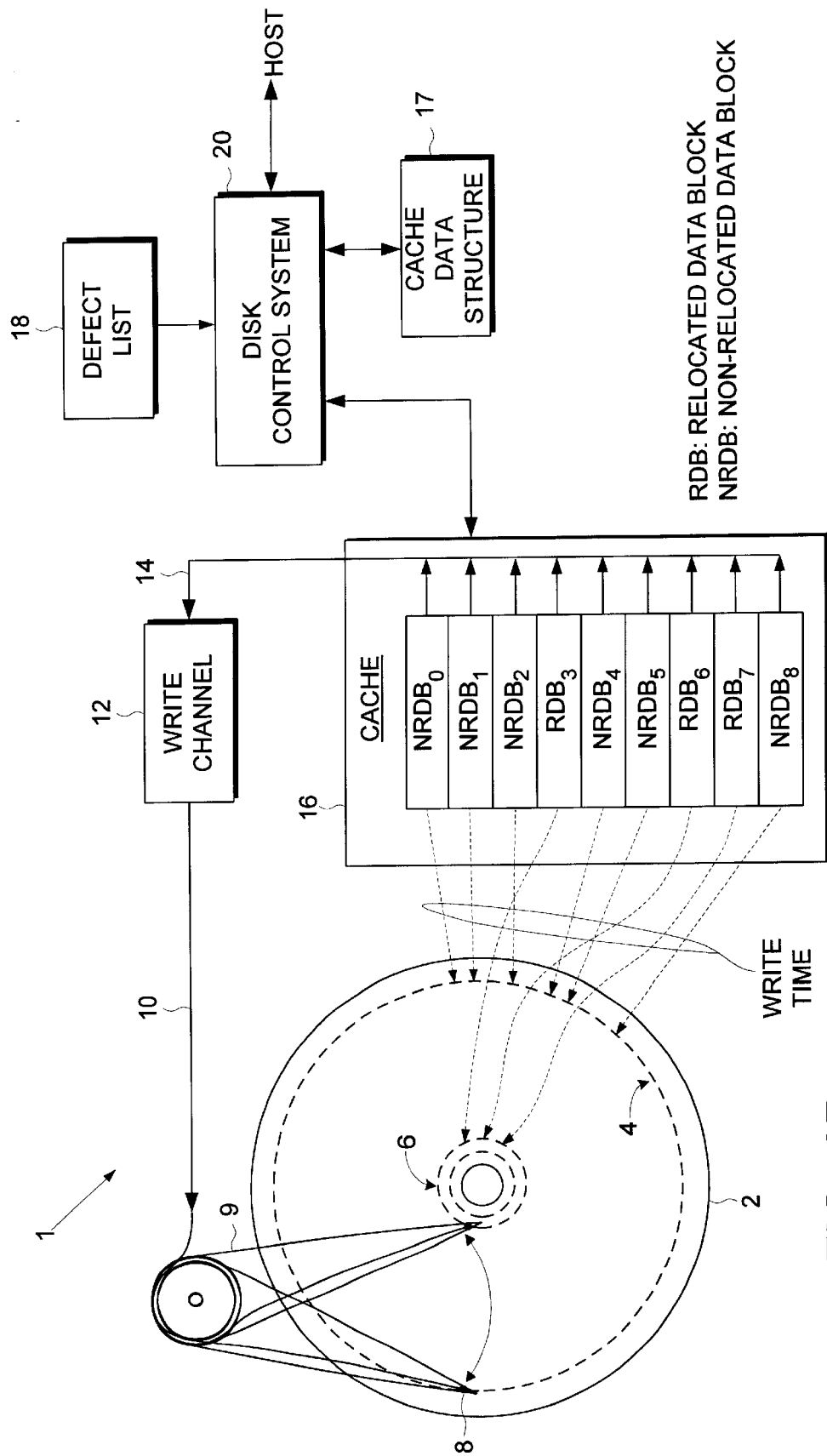
FIG. 1B shows a prior art disk drive comprising a data track and a spare track, wherein a seek operation is performed to write relocated data blocks to a spare track when writing a consecutive sequence of LBAs.

In one embodiment of the present invention, the cache 24 comprises a sufficient number of second set memory locations 26 to store relocated data blocks for all of the spare disk locations. In an alternative embodiment, a smaller set of memory locations may be reserved for storing relocated data blocks in order to increase efficiency and reduce cost. In either embodiment, if the relocated data blocks associated with several consecutive write commands are stored in the cache 24, the disk drive 22 does not need to seek to the spare tracks during the write operations. Writing of relocated data blocks can be deferred to a later time, for example, during an idle time of the disk drive 22. For example, if the disk drive 22 receives a command from the host to write the consecutive LBAs 0–8 shown in FIG. 1A, the disk drive 22 will perform a seek operation to position the head 8 over data track 4. The disk drive 22 will then use the NRDB cache data structure 23 to write the non-relocated data blocks ($NRDB_0$, $NRDB_1$, $NRDB_2$, $NRDB_4$, $NRDB_5$ and $NRDB_8$) to the disk 2. During idle time, the disk drive 22 will perform a seek operation to position the head 8 over spare track 6, and then use the RDB cache data structure 25 to write the relocated data blocks ($RDB_3$, $RDB_6$ and $RDB_7$) to the disk 2. This results in uninterrupted writing of the non-relocated data blocks for consecutive write commands, thereby reducing or even eliminating the need to pause the data transfer from the host to the disk drive 22.

A request to write a relocated data block may be received from the host before a previous request to write the same relocated data block has been completed. When this happens, the relocated data block stored in the cache 24 is simply overwritten with the new relocated data block, and the new relocated data block is written to the disk 2 during the deferred time, such as during idle time.

In the embodiment shown in FIG. 2, the disk control system 30 evaluates the defect list as the data blocks are received from the host in order to identify the relocated data blocks. The non-relocated data blocks are then stored directly to the first set of memory locations 28 using the NRDB data cache structure 23, and the non-relocated data blocks are stored directly to the second set of memory locations 26 using the RDB data cache structure 25.

Figure 3:
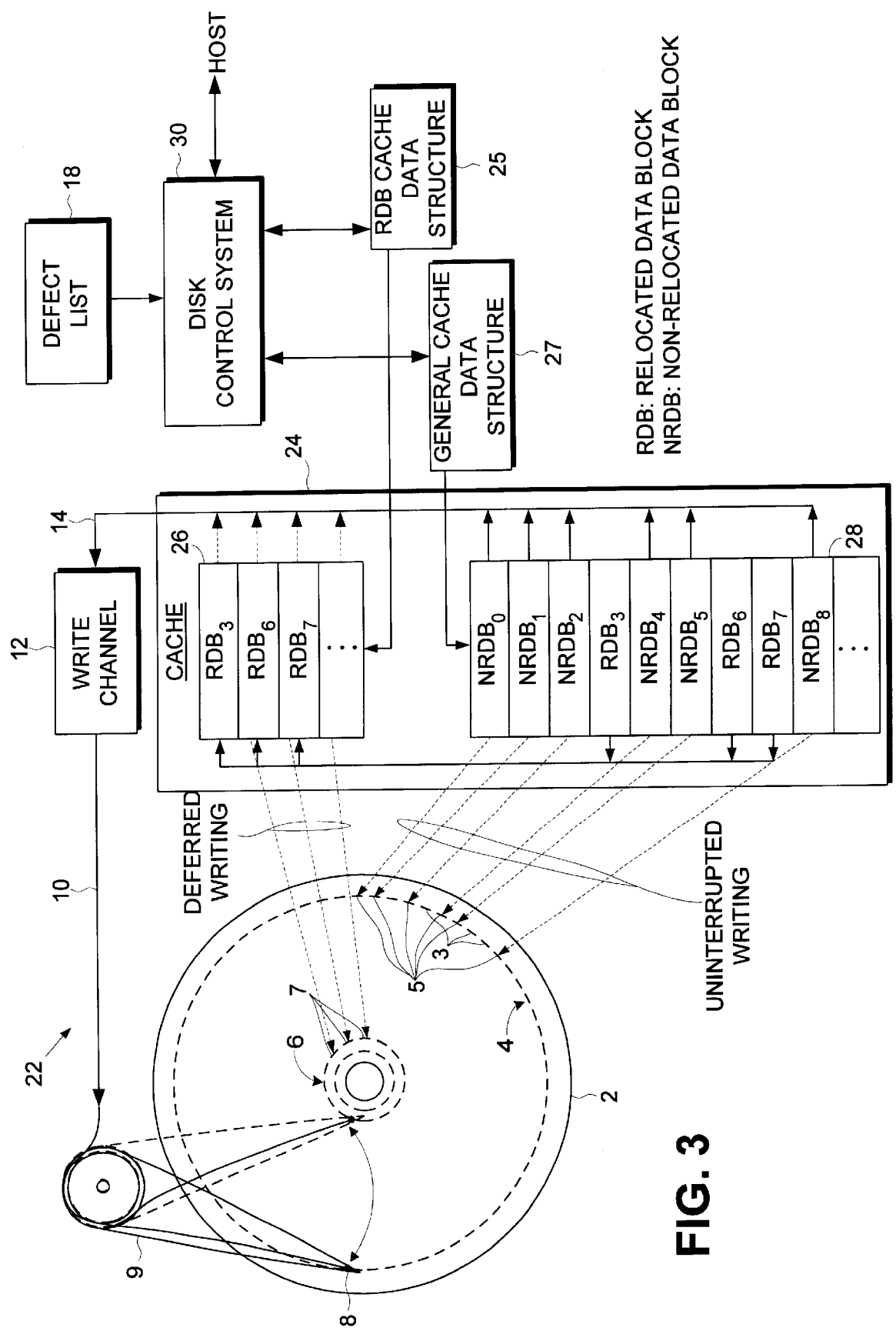
FIG. 3 shows an embodiment of the present invention wherein the relocated data blocks are first stored in the first set of memory locations and then copied to the second set of memory locations.

In an alternative embodiment shown in FIG. 3, both the non-relocated data blocks as well as the relocated data blocks are stored to the first set of memory locations 28 using a general cache data structure 27 as they are received from the host. Thereafter, the disk control system 30 evaluates the defect list 18 to identify the relocated data blocks, and then using both the general cache data structure 27 and the RDB cache data structure 25, copies the relocated data blocks to the second set of memory locations 26.

Figure 4:
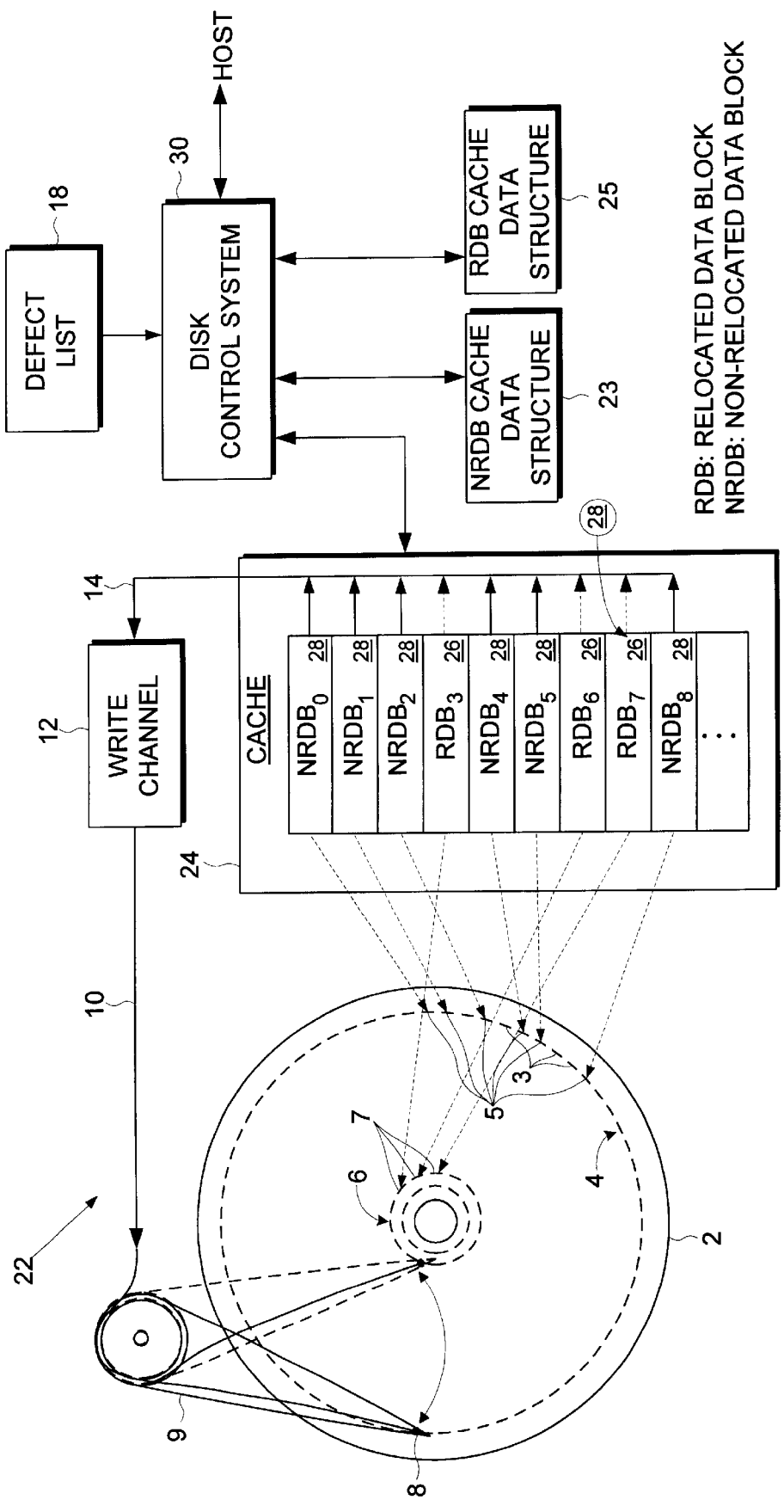
FIG. 4 shows an embodiment of the present invention wherein at least one of the relocated data blocks is stored in a first set memory location which is converted to a second set memory location by changing the RDB and NRDB cache data structures, such as reassigning pointers.

In yet another embodiment shown in FIG. 4, the relocated data blocks are stored in the second set of memory locations 26 by manipulating pointers in the NRDB and RDB cache data structures 23 and 25. For example, as the data blocks are received from the host, the disk control system 30 may identify and store the relocated data blocks directly to the cache 24 and update pointers in the RDB cache data structure 25 accordingly. Alternatively, the disk control system may store all of the data blocks received from the host into the cache 24 using the NRDB cache data structure 23, and then reassign pointers in the NRDB and RDB cache data structures 23 and 25 based on relocated data blocks identified by the defect list 18. For example, in FIG. 4 the disk control system 30 may first store $RDB_7$ directly to a first set memory location 28 using the NRDB cache data structure 23, and then reassign that memory location to the RDB cache data structure 25 once the data block is identified as relocated using the defect list 18. The reassignment is effectuated by manipulating pointer values in the NRDB and RDB cache data structures 23 and 25.

The size of cache 24 is a design choice wherein a larger cache will generally increase performance since more data blocks (non-relocated and relocated) can be buffered to facilitate multiple write requests received from the host. However, a larger cache increases the cost of the disk drive. In an alternative embodiment of the present invention, the size of the cache 24 and associated cost is reduced by limiting the number of relocated data blocks that are cached at any given time, thereby reducing the necessary size of the second set of memory locations 26. In yet another embodiment, the size of the second set of memory locations 26 is dynamic. For example, the second set of memory locations 26 may be initialized to a small number in order to reserve more memory locations for storing non-relocated data blocks. The size of the second set of memory locations 26 may be increased over time to improve performance, particularly as the number of relocated data blocks increases due to grown defects manifesting over the life of the disk drive. Alternatively, the size of the second set of memory locations 26 may decrease if the disk drive is reformatted or otherwise manipulated in order to push down a number of LBAs past defective sectors instead of mapping the LBAs to spare disk locations. In other words, the number of second set memory locations may change over time to compensate for changes to the number of LBAs mapped from a plurality of defective disk locations to a plurality of spare disk locations.

I claim:

1. A disk drive for receiving a write command from a host computer, the write command comprising a plurality of logical block addresses (LBAs) and a plurality of data blocks, wherein:

the plurality of data blocks comprises at least one non-relocated data block (NRDB) and at least one relocated data block (RDB), and at least one of the LBAs corresponds to the at least one NRDB and at least one of the LBAs corresponds to the at least one RDB, the disk drive comprising:
a disk comprising:
a plurality of first disk locations each having a defect;
a plurality of second disk locations for storing NRDBs; and
a plurality of spare disk locations for storing RDBs;
a defect list for mapping LBAs from the plurality of first disk locations to the plurality of spare disk locations;
a cache logically partitioned into a first set of memory locations managed using a first cache data structure, and a second set of memory locations managed using a second cache data structure; and
a disk control system for:
using the first cache data structure to store the NRDB in a first memory location selected from the first set of memory locations;

evaluating the defect list using the LBAs to identify the RDB and using the second cache data structure to store the RDB in a second memory location selected from the second set of memory locations;

during a first time interval established for writing NRDBs, using the first cache data structure to write the NRDB to one of the second disk locations; and during a second time interval established for writing RDBs, using the second cache data structure to write the RDB to one of the spare disk locations.

2. The disk drive as recited in claim 1, wherein:

the RDB is stored in a third memory location selected from the first set of memory locations using the first cache data structure; and the RDB is copied from the third memory location to the second memory location using the first and second cache data structures.

3. The disk drive as recited in claim 1, wherein the first and second cache data structures are used to reassign the second memory location from the first cache data structure to the second cache data structure.

4. The disk drive as recited in claim 1, wherein the number of second set memory locations changes over time to compensate for changes to the number of LBAs mapped from the plurality of first disk locations to the plurality of spare disk locations.

5. A method of performing a write operation in a disk drive in response to a write command received from a host computer, the write command comprising a plurality of logical block addresses and a plurality of data blocks, wherein:

the plurality of data blocks comprises at least one non-relocated data block (NRDB) and at least one relocated data block (RDB), and at least one of the LBAs corresponds to the at least one NRDB and at least one of the LBAs corresponds to the at least one RDB, the disk drive comprising:
a disk comprising:
a plurality of first disk locations each having a defect;

a plurality of second disk locations for storing NRDBs; and a plurality of spare disk locations for storing RDBs;

a defect list for mapping a LBAs from the plurality of first disk locations to the plurality of spare disk locations; and a cache logically partitioned into a first set of memory locations managed using a first cache data structure, and a second set of memory locations managed using a second cache data structure, the method of performing the write operation comprising the steps of:

using the first cache data structure to store the NRDB in a first memory location selected from the first set of memory locations;

evaluating the defect list using the LBAs to identify the RDB and using the second cache data structure to store the RDB in a second memory location selected from the second set of memory locations;

during a first time interval established for writing NRDBs, using the first cache data structure to write the NRDB to one of the second disk locations; and during a second time interval established for writing RDBs, using the second cache data structure to write the RDB to one of the spare disk locations.

6. The method as recited in claim 5, further comprising the steps of:

storing the RDB in a third memory location selected from the first set of memory locations using the first cache data structure; and copying the RDB from the third memory location to the second memory location using the first and second cache data structures.

7. The method as recited in claim 5, further comprising the step of using the first and second cache data structures to reassign the second memory location from the first set cache data structure to the second cache data structure.

8. The method as recited in claim 5, further comprising the step of changing the number of second set memory locations over time to compensate for changes to the number of LBAs mapped from the plurality of first disk locations to the plurality of spare disk locations.

* * * * *